United States Patent [19]

Akhtar

[11] Patent Number: 5,013,697

[45] Date of Patent: May 7, 1991

[54] SEALING GLASS COMPOSITIONS

[75] Inventor: Masyood Akhtar, San Diego, Calif.

[73] Assignee: Johnson Matthey Inc., Valley Forge, Pa.

[21] Appl. No.: 541,606

[22] Filed: Jun. 21, 1990

[51] Int. Cl.$^5$ .......................... C03C 3/21; C03C 8/10
[52] U.S. Cl. .......................................... 501/46; 501/22
[58] Field of Search ..................................... 501/46, 22

[56] References Cited

U.S. PATENT DOCUMENTS

| | | | |
|---|---|---|---|
| 4,342,943 | 8/1982 | Weaver | 501/46 |
| 4,401,767 | 8/1983 | Dietz et al. | 501/19 |
| 4,436,785 | 3/1984 | Dietz et al. | 428/427 |
| 4,459,166 | 7/1984 | Dietz et al. | 156/89 |
| 4,636,254 | 1/1987 | Husson, Jr. et al. | 106/1.14 |
| 4,741,849 | 5/1988 | Naito et al. | 501/46 |
| 4,743,302 | 5/1988 | Dumesnil et al. | 501/46 |
| 4,761,224 | 8/1988 | Husson, Jr. et al. | 106/1.14 |

*Primary Examiner*—Mark L. Bell
*Attorney, Agent, or Firm*—Christie, Parker & Hale

[57] ABSTRACT

A sealing glass composition comprising, in wt. %, 30–70% lead oxide, 30–60% vanadium oxide, 1–10% phosphorous oxide, 0–30% bismuth oxide, 0.5 to 5% niobium oxide, and 1–15% of at least one oxide from the group consisting of tellurium oxide and selenium oxide.

4 Claims, No Drawings

SEALING GLASS COMPOSITIONS

BACKGROUND OF THE INVENTION

The present invention relates to sealing glass compositions. More particularly, the invention relates to sealing glass compositions for bonding ceramics and still more particularly to compositions useful in bonding ceramics with satisfactory bond strength even when fired at temperatures of less than 400° C.

Semi-conductor devices or chips, also known as "dies", are packaged in hermetically sealed ceramic containers to resist breakage and destruction. Such ceramic packages may be made of alumina, silicon carbide, silicon nitride, or other ceramics. A common packaging material is alumina ($Al_2O_3$).

Ceramic packages of the type described are typically sealed by applying a sealing glass composition to the surfaces of the ceramic components and then heating them to elevated temperatures to effect bonding. One problem which has arisen in connection with such ceramic packages is that the sealing glass compositions heretofore known have typically required firing at temperatures of 400° C. or higher to achieve bonding of the ceramic components with satisfactory bond strength. For example, sealing glasses based on lead borate systems, such as have been commonly used, required firing at 430° C. to produce the desired bond strength. However, many of the new semi-conductor dies are much more sensitive to firing temperature and their usefulness will be adversely affected by exposure to temperature over 400° C. Dies which are sensitive to firing temperature include larger dies and dies employing fine line geometry. In the latter case, lines of Si-$SiO_2$-Si which are spaced 1 to 2 microns apart are provided at the die surface. Firing at high temperatures to accomplish bonding tends to destroy the usefulness of these dies due to incipient melting of the line compositions which may result in undesirable contact between the lines.

It is therefore desirable to be able to provide a ceramic package which does not require firing at these elevated temperatures to achieve satisfactory bond strength.

SUMMARY OF THE INVENTION

The present invention provides a novel sealing glass composition for bonding ceramics. A sealing glass composition in accordance with the invention enables bonding of ceramics by firing at temperatures of less than 400° C. while still producing satisfactory bond strength. The composition comprises, in wt. %, 18-70% lead oxide, 18-60% vanadium oxide, 1-10% phosphorous oxide, 0.5-5% niobium oxide, 0-30% bismuth oxide, and 1-15% of at least one oxide from the group consisting of tellurium oxide and selenium oxide. The preferred composition comprises 18-55% PbO, 18-55% $V_2O_5$, 1-15% $TeO_2$ and/or $SeO_2$, 0.7-30% $Bi_2O_3$, 1-5% $Nb_2O_5$ and 3-5% $P_2O_5$.

Since the sealing glass composition is typically used as a sealing glass paste, another aspect of the invention is a method of making such a paste. The method comprises preparing a mixture of a sealing glass composition as described, heating the glass mixture to a temperature and for a time sufficient to melt the glass mixture, quenching the resulting molten glass to solidify same, comminuting the solidified glass to produce glass particles and thoroughly mixing the glass particles with an organic solvent to produce a glass paste.

The invention further contemplates a method of bonding ceramic surfaces which comprises applying a coating of the sealing glass paste produced as described above to at least one of the ceramic surfaces to be bonded, the sealing glass paste being formed of the glass composition also described above, and thereafter heating the sealing glass paste and ceramic surfaces to be bonded to an elevated temperature of less than 400° C. to effect bonding and thereafter cooling the bonded ceramic surface.

DESCRIPTION OF THE PRESENTLY PREFERRED EMBODIMENT

As indicated previously, the sealing glass composition in accordance with the invention comprises, in wt. %, 18-70% lead oxide, 18-60% vanadium oxide, 1-10% phosphorous oxide, 0.5-5% niobium oxide, 0-30% bismuth oxide and 1-15% of at least one oxide from the group consisting of tellurium oxide and selenium oxide. All percentages as used herein are weight percentages. The presently preferred composition consists essentially of about 18-55% PbO, about 3-5% $P_2O_5$, about 1-5% $Nb_2O_5$ and about 1-15% $TeO_2$ and/or $SeO_2$. The preferred optional amount of $Bi_2O_3$ is about 0.7-30%.

The basic glass composition comprises the glass formers vanadium oxide ($V_2O_5$) and lead oxide (PbO). The desired characteristics of the composition are created by the addition of the other components but the amounts of $V_2O_5$ and PbO should be in the stated ranges to assure amenability to development of the desired properties by the addition of the other additives. In formulating the composition, the amounts of lead oxide and vanadium oxide and the other additives are selected so that the PbO and $V_2O_5$ can interact with the other components to result in a mixture capable of being satisfactorily fired at the desirably low temperature.

Niobium oxide ($Nb_2O_5$) is included in the glass mixture to control the thermal expansion of the glass so as to avoid an excessive mismatch between the thermal expansion of the glass composition and the ceramic components to be bonded. However, the amount of niobium oxide should be controlled to avoid unfavorably impacting on the desired low firing temperature of the glass composition. An amount of niobium oxide of from 0.5-5 weight percent is believed to be most effective for this purpose.

Phosphorus oxide ($P_2O_5$) is useful to decrease the melting point of the glass composition in which it is a component. An amount of 1-10% phosphorous oxide, e.g., $P_2O_5$, satisfies this function without impacting adversely on the firing temperature of the glass.

Tellurium oxide ($TeO_2$) and selenium oxide ($SeO_2$) both function to increase the fluidity of the glass composition and thus make the glass more reactive with the ceramics to accomplish effective bonding. Tellurium oxide and selenium oxide may be used alone or in combination in the amount of 1-15%.

Bismuth oxide ($Bi_2O_3$) increases the wetability of the glass composition on a ceramic substrate. It is especially useful as an additive for bonding ceramic substrates having metallic coatings, e.g. gold, thereon because the bismuth oxide provides improved wetability of the metallic coating on the ceramic substrate. Although glass compositions may be formulated without bismuth oxide if metal coated substrates are not involved, the presence of bismuth oxide renders the glass composition more versatile and capable of broader usage. The preferred amount of $Bi_2O_3$ is 0.7 to 30%.

The following examples illustrate the practice of the present invention according to the best mode now contemplated.

A mixture of the following ingredients was prepared in the weight percentages noted in Table 1 below. These oxides were mixed together and then heated in a crucible to a temperature of 900° C. After holding for 1.5 hours the resulting molten mixture was quenched in water and a fritted glass product resulted. The fritted glass was dried at 150° C. for 6 hours and thereafter comminuted by a mechanical grinding to less than 325 mesh size. The resulting ground glass was thoroughly mixed with the organic solvent "TEXANOL", to coat the particles and produce a glass paste.

TABLE 1

| Chemical | Weight % |
| --- | --- |
| Lead oxide | 50.74 |
| Vanadium oxide | 41.34 |
| Tellurium oxide | 1.38 |
| Niobium oxide | 1.84 |
| Phosphorous pentaoxide | 3.55 |
| Bismuth oxide | 1.15 |

To evaluate the effective of the paste in achieving satisfactory ceramic bonding after firing at relatively low firing temperature, five portions of the paste were applied to alumina surfaces after which the samples were heated in a furnace at a rate of 10° C. per minute to 350° C. and held at temperature for 10 minutes. During the heating step the organic solvent was volatized. Following heating as described, the samples were permitted to cool normally to room temperature. Bond strengths of specimens 0.4-inches square were tested and the test results are reported in Table 2 below which shows the pull strengths required to separate the bonded ceramic surfaces.

TABLE 2

| Sample | Pull Strength (psi) |
| --- | --- |
| 1 | 33.0 |
| 2 | 29.0 |
| 3 | 31.0 |
| 4 | 37.4 |
| 5 | 22.0 |

Other samples of the composition set forth in Table 3, below were prepared. The paste and samples were prepared as described above and were also subjected to similar separation tests. The results of similar separation testing are shown in Table 4.

TABLE 3

| Lead oxide | 50.37 |
| --- | --- |
| Vanadium oxide | 41.04 |
| Selenium oxide | 1.28 |
| Phosphorous pentaoxide | 4.57 |
| Niobium oxide | 1.65 |
| Bismuth oxide | 1.10 |

TABLE 4

| Sample | Strength (psi) |
| --- | --- |
| 1 | 30.0 |
| 2 | 15.5 |
| 3 | 15.0 |
| 4 | 22.0 |
| 5 | 24.0 |

It is apparent from the foregoing that the sealing glass composition of the invention is able to provide satisfactory bonding of, and to, ceramic surfaces. It is also apparent that various changes and modifications may be made in accordance with the invention without departing therefrom. For example, a variety of organic solvents may be used to form the paste of the glass composition. Ester alcohols such as 2,2,4 trimethol 1,3 pentanediol monoisobutyrate, which is sold under the trademark TEXANOL, is presently preferred but other glycol esters or glycol ether esters may be similarly used. Also, other alcohols such as N-butanol or terpineol are usable. In addition, pre-made mixtures of resin, trixotrope and solvent, as known in the field, are also useful. Moreover, the sealing glass composition of the invention may be used with a variety of ceramic substrates. Thus, the scope of the invention should be limited only by the appended claims, wherein:

What is claimed is:

1. A sealing glass composition for bonding ceramic surfaces which is capable of developing satisfactory bonding strength at firing temperatures of less than 400° C. comprising, in wt. % 18–70% lead oxide, 18–60% vanadium oxide, 1–10% phosphorous oxide, 0–30% bismuth oxide, 1–15% of at least one of the oxides from the group consisting of tellurium oxide and selenium oxide and 0.5 to 5% niobium oxide.

2. A sealing glass composition according to claim 1 wherein bismuth oxide is present in the amount of 0.7–30%.

3. A sealing glass composition according to claim 1 wherein phosphorous oxide is present up to 5%.

4. A sealing glass composition according to claim 1 comprising about 18–55% lead oxide, about 18–55% vanadium oxide, about 1–5% niobium oxide, about 3–5% phosphorous oxide, about 0.7 to 30% bismuth oxide and about 1–15% of at least one oxide from the group consisting of tellurium oxide and selenium oxide.

* * * * *

UNITED STATES PATENT AND TRADEMARK OFFICE
CERTIFICATE OF CORRECTION

PATENT NO. : 5,013,697
DATED : May 7, 1991
INVENTOR(S) : Masyood Akhtar

It is certified that error appears in the above-identified patent and that said Letters Patent is hereby corrected as shown below:

ON TITLE PAGE:

Abstract, line 2, change "30-70%" to -- 18-70% --.

Signed and Sealed this

Ninth Day of February, 1993

Attest:

STEPHEN G. KUNIN

Attesting Officer

Acting Commissioner of Patents and Trademarks